United States Patent [19]

Sugio et al.

[11] Patent Number: 4,590,239
[45] Date of Patent: May 20, 1986

[54] POLYPHENYLENE ETHER RESIN COMPOSITION SUITABLE FOR ELECTROLESS PLATING

[75] Inventors: Akitoshi Sugio, Saitama; Masanobu Masu, Osaka; Akikazu Amagai, Tokyo; Toshihiko Kobayashi, Saitama, all of Japan

[73] Assignee: Mitsubishi Gas Chemical Company, Inc., Tokyo, Japan

[21] Appl. No.: 680,633

[22] Filed: Dec. 12, 1984

[30] Foreign Application Priority Data

Dec. 15, 1983 [JP] Japan ............................ 58-236919

[51] Int. Cl. .......................................... C08L 53/00
[52] U.S. Cl. .................................. 525/92; 525/96; 525/99; 525/905
[58] Field of Search ........................... 525/92, 905

[56] References Cited

U.S. PATENT DOCUMENTS 3,660,531  5/1972  Lauchlan et al. ................. 525/905
3,994,856  11/1976  Katchman et al. .................. 525/92
4,341,879  7/1982  Sugio et al. ......................... 525/905

Primary Examiner—Jacob Ziegler
Attorney, Agent, or Firm—Sughrue, Mion, Zinn, Macpeak & Seas

[57] ABSTRACT

A polyphenylene ether resin composition comprising:
(a) a polyphenylene ether resin,
(b) a polystyrene-type resin,
(c) an A-B-A' type elastomeric block copolymer, wherein A and A' represent blocks resulting from polymerization of an aromatic vinyl compound, and B represents a block resulting from polymerization of a conjugated diene compound, and
(d) an elastomeric stryene/butadiene random copolymer, which is suitable electroless plating. Molded articles formed by using the resin composition of this invention can be plated using conventional electroless plating processes for ABS resins.

6 Claims, No Drawings

POLYPHENYLENE ETHER RESIN COMPOSITION SUITABLE FOR ELECTROLESS PLATING

FIELD OF THE INVENTION

This invention relates to a polyphenylene ether resin composition suitable for electroless plating which comprises (a) a polyphenylene ether resin, (b) a polystyrene-type resin, (c) an A-B-A' type elastomeric block copolymer (wherein A and A' represent blocks resulting from polymerization of an aromatic vinyl compound, and B represents a block resulting from polymerization of a conjugated diene compound), and (d) an elastomeric styrene-butadiene random copolymer.

BACKGROUND OF THE INVENTION

Recently, in the automotive industry it is well known that for the purpose of reducing the body weight to achieve a reduction in fuel consumption, metal materials have been replaced by synthetic resin materials. Consequently, the amount of resin materials used per car has rapidly increased. The replacement of metal materials for synthetic resin materials, however, has been attempted mainly for interior parts of cars because synthetic resins are inferior to metal materials in various properties such as heat-resistance, weather-resistance and impact strength.

On the other hand, recently, synthetic resin materials, which are not electrically conductive in themselves, have been plated with metals due to advances in electroless plating technology. As a result, synthetic resin materials have been sharply improved in several properties such as weather-resistance, stiffness and hardness, which have been regarded as a disadvantages, and have been used in exterior parts of cars as a substitute for metal materials.

Synthetic resin materials have many advantages because they can be used to produce integral articles in one molding procedure, which have been assembled from many parts in the case of using metal materials, because they can be easily molded into complicated articles, and because they are light weight. These advantages are not attained in metal materials. As a result, synthetic resin materials can be very advantageously used because the body weight of cars can be reduced and a variety of designs can be achieved in addition to plating with metals using the electroless plating process.

Presently ABS resins have been most commonly used as a resin suitable for electroless plating. Many processes have been developed for plating ABS resins with metals, and a process which comprises oxidatively etching a polybutadiene component dispersed in the ABS resin using a mixed aqueous solution containing chromium trioxide and sulfuric acid to roughen the surface of the resin and introduce hydrophilic groups on the surface of the resin; activating the surface by depositing active species such as palladium; forming a thin coating layer of a metal such as copper and nickel thereon by an electroless plating process; and then forming a desired metal coating thereon by an electric plating process has employed.

ABS resins have been determined to be resins more suitable for plating due to close adhesion between the resin and the plated metal film, which results from selective etching of a polybutadiene component dispersed in the ABS resin resulting in the surface of the resin having minute concavo-convex holes in a homogeneous dispersed state, and an anchoring effect for the metal deposited in the convex holes. Accordingly, the adhesiveness of the metal film to the resin is affected by the content of the polybutadiene component in the ABS resin. On the contrary, while heat-resistance of the ABS resin tends to decrease proportionally to the increase in the content of the polybutadiene component in the resin, the heat distortion temperature of the ABS resin plated with metals, in general, has to be under 100° C.

On the other hand, for example, in exterior parts of cars a resin having a heat distortion temperature higher than that of ABS resins, and in a hot-water supplying device parts, resins having a heat distortion temperature of 100° C. and more are desired. Thus, the demand for resin materials suitable for electroless plating and having a higher heat distortion temperature has been increasing.

SUMMARY OF THE INVENTION

An object of this invention is to provide a resin material with superior heat-resistance and suitable for plating with metals.

Another object of this invention is to provide a polyphenylene ether resin composition suitable for plating with metals.

Still another object of this invention is to provide a polyphenylene ether resin composition to which the conventional electroless plating process for ABS resins can be applied.

These and other objects and advantages of this invention will become apparent from the following description.

It is well known that polyphenylene ether resins are thermoplastic resins which have superior heat-resistance and have excellent electrical and mechanical properties, and that in order to improve poor moldability characteristics and enhance low impact strength, polyphenylene ether resins are blended with a polystyrene resin and/or an elastomer. In a polyphenylene ether resin composition modified with an elastomer, the elastomer components are dispersed in the form of a gel. It is easily considered that if the dispersed elastomers are selectively etched by oxidizing agents, the electroless plating process available for ABS resins could be employed for a polyphenylene ether resin composition. It is known that a polyphenylene ether resin composition containing a rubber-modified polystyrene can be chemically plated by the electroless plating process employed for ABS resins, but as high a level of adhessiveness has not been obtained for the polyphenylene ether resin composition above-mentioned as has been obtained with ABS resins due to the small amount of polybutadiene to be etched in the rubber-modified polystyrene and due to insufficient etching of the polyphenylene ether resin composition by oxidizing agents because of the excellent chemical resistance of both the polyphenylene ether resin and polystyrene as a matrix. Accordingly, for a polyphenylene ether resin composition a plating procedure including a specified pre-treatment procedure has been practiced without using the plating procedure for ABS resins.

According to this invention, the plating capability of a polyphenylene ether resin composition containing a polyphenylene ether resin and a polystyrene-type resin was enhanced by additionally incorporating an A-B-A' type elastomeric block copolymer and an elastomeric styrene-butadiene random copolymer therewith. That is, the object and advantages of this invention are achieved by a polyphenylene ether resin composition comprising:

(a) a polyphenylene ether resin, (b) a polystyrene-type resin (c) an A-B-A' type elastomeric block copolymer, wherein A and A' represent blocks resulting from polymerization of an aromatic vinyl compound, and B represents a block resulting from polymerization of a conjugated diene compound, and (d) an elastomeric styrene/butadiene random copolymer.

DETAILED DESCRIPTION OF THE INVENTION

The polyphenylene ether resin (a) of the resin composition of this invention denotes a polyphenylene ether, obtained by oxidatively polycondensing a monocyclic phenol represented by the following formula (I), or a grafted polymer obtained by grafting an aromatic vinyl compound to such a polyphenylene ether. The polyphenylene ether may be a homopolymer or a copolymer of two or more monocyclic phenols of the formula (I).

The monocyclic phenol to obtain the polyphenylene ether is represented by the following formula (I):

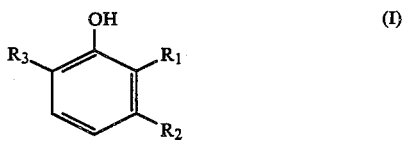

wherein $R_1$ represents a lower alkyl group having 1 to 3 carbon atoms, and $R_2$ and $R_3$, which may be the same or different, each represents a hydrogen atom or a straight or branched chain alkyl group having 1 to 3 carbon atoms.

The homopolymer can be obtained from a single monocyclic phenol, and the copolymer from two or more monocyclic phenols.

The alkyl group having 1 to 3 carbon atoms in the general formula (I) denotes a methyl, ethyl, n-propyl or isopropyl group.

Examples of suitable monocyclic phenols of the general formula (I), which can be used, include 2,6-dimethylphenol, 2,6-diethylphenol, 2,6-dipropylphenol, 2-methyl-6-ethylphenol, 2-methyl-6-propylphenol, 2-ethyl-6-propylphenol, o-cresol, 2,3-dimethylphenol, 2,3-diethylphenol, 2,3-dipropylphenol, 2-methyl-3-ethylphenol, 2-methyl-3-propylphenol, 2-ethyl-3-methylphenol, 2-ethyl-3-propylphenol, 2-propyl-3-methylphenol, 2-propyl-3-ethylphenol, 2,3,6-trimethylphenol, 2,6-dimethyl-3-ethylphenol and 2,6-dimethyl-3-propylphenol.

Examples of polyphenylene ethers obtained by polycondensing these monocyclic phenols described-above include homopolymers such as poly(2,6-dimethyl-1,4-phenylene) ether, poly(2,6-diethyl-1,4-phenylene) ether, poly(2,6-dipropyl-1,4-phenylene) ether, poly(2-methyl-6-propyl-1,4-phenylene) ether and poly(2-ethyl-6-propyl-1,4-phenylene) ether, and copolymers such as 2,6-dimethylphenol/2,3,6-trimethylphenol copolymer, 2,6-diethylphenol/2,3,6-trimethylphenol copolymer, and 2,6-dipropylphenol/2,3,6-trimethylphenol copolymer.

Of these, poly(2,6-dimethyl-1,4-phenylene) ether, and 2,6-dimethylphenol / 2,3,6-trimethylphenol copolymer, are preferred.

These polyphenylene ether homo- and co-polymers can be produced by methods well-known in the art, for example, as disclosed in U.S. Pat. Nos. 3,306,875; 4,011,200; and 4,067,851.

As the above-described grafted polyphenylene ether polymer, a preferred grafted polymer is a graft polymer obtained by grafting an aromatic vinyl compound represented by the following formula (II)

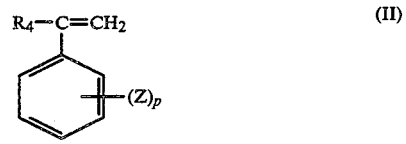

wherein $R_4$ represents a hydrogen atom or a methyl group, Z represents a halogen atom such as chlorine and bromine or a methyl group, and p is 0 or an integer of 1 to 3, to the homo- or co-polymer of the polyphenylene ether. The grafted polymer can be produced, for example, by the method described in Japanese Laid-Open Patent Publication No. 126800/1975. Examples of suitable aromatic vinyl compounds which can be grafted are styrene, alpha-methylstyrene, vinyltoluene, vinylxylene, ethylstyrene, n-propylstyrene, isopropylstyrene, chlorostyrene and bromostyrene.

Of these grafted polymers, a graft polymer of poly(2,6-dimethyl-1,4-phenylene) ether with styrene and a graft polymer of 2,6-dimethyl-phenol / 2,3,6-trimethylphenol copolymer with styrene are preferred.

The polystyrene-type resin (b) used in the resin composition of this invention denotes a resin containing at least about 25% by weight of structural units of the following formula (III)

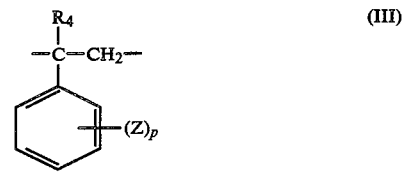

wherein $R_4$, Z and p are as defined with regard to the formula (II).

The structural units of the formula (III) are derived from a styrene monomer of the above formula (II).

Examples of preferred polystyrene-type resins are polystyrene, high-impact polystyrene (rubber-modified polystyrene), styrene/butadiene/ acrylonitrile copolymer, styrene/ alpha-methylstyrene copolymer, styrene/ maleic anhydride copolymer, high-impact styrene/ maleic anhydride copolymer, styrene/ p-methylstyrene copolymer, poly-p-methylstyrene, high-impact poly-p-methylstyrene and poly-p-methylstyrene/ maleic anhydride copolymer. Of these, high-impact polystyrene is especially preferred.

The A-B-A' type elastomeric block copolymer (c) above-described, used in the resin composition of this invention, should have a Young's modulus at room temperature (about 20°–30° C.) of about $10^5$ to about $10^9$ dynes/$cm^2$ (0.1 to 1020 kg/$cm_2$) in accordance with the definition given in A. V. Tobolsky, *Properties and Structures of Polymers,* pages 71 to 78, John Wiley &

Sons, Inc., New York (1960). In the block copolymer (c), it is necessary for the molecular weight of the block B to be higher than the total sum of the molecular weight of the block A and the molecular weight of the block A'. The block A or A', which may be the same or different, is, for example, a homo-block or co-block resulting from polymerization of a monocyclic aromatic vinyl compound, such as styrene, alpha-methylstyrene, vinyltoluene, vinylxylene and ethylstyrene, or polycyclic aromatic vinyl compound, such as vinylnaphthalene, or a mixture thereof, and preferably each block has a molecular weight of about 2,000 to about 100,000. The block B is, for example, an elastomeric block resulting from polymerization of a conjugated diene compound, such as 1,3-butadiene, isoprene, 2,3-dimethyl butadiene and 1,3-pentadiene, and preferably has a molecular weight of about 25,000 to about 1,000,000. In the block copolymer (c), styrene as the aromatic vinyl compound and 1,3-butadiene or isoprene as the conjugated diene compound are preferably used, respectively.

The elastomeric styrene/butadiene random copolymer (d) used in the resin composition of this invention denotes a random copolymer which is composed of about 25 to about 75%, preferably 50 to 70%, by weight of a component derived from styrene and about 25 to about 75%, preferably 30 to 50%, by weight of a component derived from butadiene, and does not substantially contain an insoluble gel. One of these random copolymers is, for example, commercially available from Nippon Geon Company, Ltd. under the trade name of "Nippol 2057 S."

Components (c) and (d) can be present in the composition in a total amount of about 5 to about 30% by weight based upon the total weight of the resin composition of this invention. When components (c) and (d) are used in amounts below about 5% by weight, the level of adhessiveness of the metal film to the resin material is insufficient. On the other hand, when they are present in amounts exceeding about 30% by weight, flow marks arise on the surface of the molded article which result in poor appearance. The blending ratio of component (c) and component (d) may be optionally selected without any limitations, but generally component (c) is preferably used in an amount of about 5 to about 80% by weight based upon the total weight of components (c) and (d).

Moreover, the blending ratio of component (a) and component (b) in the resin composition of this invention may also be optionally selected without any limitations, but, from the standpoint of properties such as heat-resistance, mechanical properties and moldability, component (a) may preferably be present in an amount of about 15 to about 75%, preferably 20 to 60%, by weight based upon the total weight of components (a) and (b).

The discovery that the plating capability of a resin composition containing a polyphenylene ether resin and a polystyrene-type resin is improved by additionally incorporating component (d) as in this invention, is novel and unexpected from the prior art, because little attention has been paid to component (d) as a modifier for a resin composition containing a polyphenylene ether resin and a polystyrene-type resin because addition of component (d) results in a molded article with a poor appearance.

In preparing the resin composition of this invention, all the components can be mixed using known methods, for example, by mechanically mixing them with a roll mill, a Banbury mixer, an extruder, etc., or by mixing solutions or suspensions of the above components and removing the solvents or liquid media.

To the resin composition of this invention, if desired, various additives such as stabilizers, which are exemplified by sterically hindered phenols or phosphite compounds; flame-retardants, which are exemplified by aromatic halogenated compounds; lubricants, which are exemplified by polyethylene wax or polypropylene wax; pigments, which are exemplified by titanium dioxide or zinc oxide; and fillers, which are exemplified by glass fiber, asbestos, mica, clay etc, may be added so long as the plating capability of the resin composition of this invention is not degraded.

The polyphenylene ether resin composition of this invention obtained thereby can be finished into a plated molded article through the steps comprising preparing an article of a desired shape therefrom by a molding, pretreating the molded article according to a known pretreating procedure, e.g., as disclosed in *Encyclopedia of Polymer Sience and Technology, pages* 639–666, John Wiley & Sons, Inc., New York (1968) and plating it by a known plating process, as disclosed in the same literature above mentioned.

The following Examples are given to illustrate the polyphenylene ether resin composition of this invention and the plated articles obtained therefrom more specifically. Unless otherwise specified, all parts and percentages in the following description are by weight.

The plating procedures for molded articles obtained from the resin composition of this invention were as follows.

"Plating Prescription A"

The molded article was pre-treated through steps comprising thoroughly cleaning by use of a neutral detergent; washing with water; immersing in an aqueous etching solution containing 400 grams per liter of chromium trioxide and 200 grams per liter of concentrated sulfuric acid for 5 minutes at 65° C.; and washing with solution containing hydrazine, hydrochloric acid and a nonionic surface active agent and a next neutralizing aqueous solution containing ethylenediamine.

The surface-etched article above-obtained was immersed in a commercially available sensitizing solution containing 15 grams of stannous chloride hydrate and 20 ml of concentrated hydrogen chloride in one liter for 5 minutes at room temperature to deposit metal catalyst thereon and next in a commercially available activating solution containing 0.25 gram of palladium and 5 ml of concentrated hydrogen chloride in one liter, and was washed with water. The surface-activated article was immersed in a commercially available electroless-plating solution containing 25 grams of nickel phosphate, 50 grams of sodium pyrophosphate and 25 grams of sodium hypophosphite in one liter at 65° to 75° C. for several minutes to plate the article with nickel by an electroless plating process.

The electroless-plated article above-obtained was electroplated in a plating solution contained 210 grams of copper sulfate, 60 grams of sulfuric acid, 0.012 gram of hydrochloric acid, 0.01 gram of dextrin and 0.01 gram of urea, each in one liter of aqueous solution, under the conditions of a period of 45 to 50 minutes at 35° C. and a current density of 3 to 4 $A/dm^2$. A copper film having a thickness of about 30 microns was formed on the surface of the article.

"Plating Prescription B"

The procedures of "Plating Prescription A" were repeated except that the molded article was immersed in ethyleneglycol monoethylether for 10 minutes at 60° C. after cleaning with a neutral detergent and washing with water and an aqueous solution containing 200 grams per liter of chromium trioxide and 200 grams per liter of concentrated sulfuric acid was used as an etching solution. The formed copper film had a thickness of about 30 microns.

EXAMPLE 1

Thirty-five parts of poly(2,6-dimethyl-1,4-phenylene) ether having an intrinsic viscosity, determined at 25° C. in chloroform, of 0.52 dl/g, 42 parts of a rubber modified polystyrene (an intrinsic viscosity of the polystyrene matrix measured at 25°°C. in chloroform, of 0.8 dl/g; a gel content analyzed by using methyl ethyl ketone as a solvent, of 21%), 2.5 parts of an elastomeric polystyrene-polybutadiene-polystyrene block copolymer (a weight ratio of the polystyrene blocks to the polybutadiene block, of 30:70; a viscosity, measured at 25° C. in a 20% toluene solution thereof by means of a Blookfield Model RVT viscometer, of 1,500 cps., available from Shell Chemical Co., Ltd. under the trade name of "KRATON TR 1101") and 20.5 parts of a styrene-butadiene random copolymer (a weight ratio of styrene to butadiene of 63:37; available from Nippon Geon Company, Ltd. under the trade name of "Nippol 2057 S") were thoroughly mixed using a Henschel mixer. The resulting mixture was pelletized by extrusion through a twin-screw extruder. The pellets were molded using an injection molding machine to prepare test samples for measurement of various properties.

Furthermore, test samples having a thickness of 3.2 mm, a width of 12.5 mm and a length of 125 mm were plated according to Plating Prescription A. The peel strength of the formed metal film was measured by a peeling test for evaluating adhessiveness of the metal film. The results obtained were as follows.

| Tensile Strength | 430 kg/cm$^2$ |
|---|---|
| Izod Impact Strength (notched) | 25 kg · cm/cm |
| Heat Distortion Temperature (264 psi) | 112° C. |
| Peel Strength | 1.4 kg/cm |

EXAMPLE 2

The procedures of Example 1 were repeated except that a 2,6-dimethylphenol (95 mole %) / 2,3,6-trimethylphenol (5 mole %) copolymer having an intrinsic viscosity, determined at 25° C. in chloroform, of 0.5 dl/g was used instead of poly(2,6-dimethyl-1,4-phenylene)ether.

The results obtained were as follows.

| Tensile Strength | 440 kg/cm$^2$ |
|---|---|
| Izod Impact Strength (notched) | 27 kg · cm/cm |
| Heat Distortion Temperature (264 psi) | 114° C. |
| Peel Strength | 1.5 kg/cm |

EXAMPLE 3

A mixture of 45 parts of the rubber-modified polystyrene as described in Example 1, 45 parts of the styrene-butadiene random copolymer as described in Example 1 and 10 parts of an elastomeric block copolymer as described in Example 1 was blended by using a twin-screw extruder into a preblend.

Thirty-seven parts of the preblend, 21 parts of a polyphenylene ether resin as described in Example 1 and 42 parts of a rubber-modified polystyrene as described in Example 1 were thoroughly mixed using a Henschel mixer. The resulting mixture was molded to prepare test samples according to the procedures of Example 1.

The results obtained using the same method as described in Example 1 were as follows.

| Tensile strength | 350 kg/cm$^2$ |
|---|---|
| Izod impact strength (notched) | 20 kg · cm/cm |
| Heat distortion temperature (264 psi) | 102° C. |
| Peel strength | 1.6 kg/cm |

EXAMPLES 4 to 6

Resin compositions obtained by mixing of a polyphenylene ether copolymer as described in Example 2 (referred to as PPE in Table 1), a rubber-modified polystyrene as described in Example 1 (referred to as HIPS in Table 1) and a preblend as described in Example 3 (referred to as PB in Table 1) in the proportions shown in Table 1 below were molded to prepare test samples according to the procedures of Example 1.

The plating procedures were those of Plating Prescription B.

The results obtained are shown in Table 1.

TABLE 1

| | Example Number | | |
|---|---|---|---|
| | 4 | 5 | 6 |
| Components: (parts) | | | |
| PPE | 46 | 33 | 20 |
| HIPS | 17 | 35 | 43 |
| PB | 37 | 32 | 37 |
| Properties: | | | |
| Tensile strength (kg/cm$^2$) | 530 | 420 | 340 |
| Izod impact strength (notched, kg · cm/cm) | 26 | 23 | 20 |
| Heat distortion temperature (°C.) | 122 | 112 | 100 |
| Peel strength (kg/cm) | 2.0 | 2.5 | 2.0 |

EXAMPLE 7

Thirty-two parts of a 2,6-dimethylphenol/2,3,6-trimethylphenol polyphenylene ether copolymer containing 5 mole % of 2,3,6-trimethylphenol (having an intrinsic viscosity, determined at 25° C. in chloroform, of 0.51 dl/g), 50 parts of a rubber-modified polystyrene as described in Example 1, 14.5 parts of the styrene-butadiene random copolymer as described in Example 1, 3.5 parts of an elastomeric polystyrene-polybutadiene-polystyrene block copolymer as described in Example 1 and 2 parts of titanium dioxide were thoroughly mixed using a Henschel mixer. The resulting mixture was pelletized by extrusion through a twin-screw extruder. The pellets were molded by an injection molding machine to prepare test samples as shown in Table 2 below.

The molded articles were plated using the procedure of Plating Prescription B. The plated articles obtained were further plated with nickel and chromium according to the known plating procedures. For example, a chromium electroplating procedure was practiced using a plating solution contained 250 grams of chromium trioxide and 2.5 grams of sulfuric acid in one liter of aqueous plating solution, under the conditions of a current density of 15 to 30 A/dm$^2$, a current efficiency of 12 to 13% and a voltage of 4 to 5 V at 40° to 50° C., and using the anode of lead alloy.

The finished articles were subjected to heat cycle testing by exposing the articles repeatedly for 60 minutes at minus 40° C. and 60 minutes at 120° C. to observe the appearance of the articles. The results obtained are shown in Table 2 below.

The symbols used in Table 2 have the following meaning:

O : No changes in appearance were observed

Δ: Minute swellings on the surface of the articles were observed

X : A lot of swellings and cracks were observed

For comparison with the results of Example 7, commercially available wheel covers of cars, which were molded using ABS resin and modified polyphenylene ether resin as a resin material, and plated with metals, were subjected to the same heat cycle testing as in Example 7.

The results obtained are shown in Table 2 below.

TABLE 2

|  | Plated Molded Articles | | Heat Cycle Test(times) | | |
|---|---|---|---|---|---|
|  | Shape | Size (mm) | 1 | 3 | 6 |
| EXAMPLE 7 | Box | 100 × 120 × 70 Depth 3 | O | O | O |
|  | Disc | Diameter 100 Thickness 3 | O | O | O |
|  | Wheel Cover ABS resin used | | X | — | — |
|  | Wheel Covers | | | | |
|  | Commercial Goods A | | O | O | Δ |
|  | Commercial Goods B | | O | Δ | X |
|  | Commercial Goods C modified polyphenylene ether resin used | | Δ | X | — |

While the invention has been described in detail and with reference to specific embodiments therof, it will be apparent that various changes and modifications can be made therein without departing from the spirit and scope thereof.

We claim:

1. A polyphenylene ether resin composition, suitable for electroless plating, comprising:
   (a) a polyphenylene ether resin,
   (b) a polystyrene-type resin,
   (c) an A-B-A' type elastomeric block copolymer, wherein A and A' represent blocks resulting from polymerization of an aromatic vinyl compound, and B represents a block resulting from polymerization of a conjugated diene compound, and
   (d) an elastomeric styrene/butadiene random copolymer, wherein the elastomeric styrene/butadiene random copolymer (d) is selected from the group consisting of random copolymers composed of about 25 to about 75% by weight of a component derived from styrene and about 75 to about 25% by weight of a component derived from butadiene, and substantially free of an insoluble gel,
wherein the resin composition contains about 70 to about 95% by weight of components (a) and (b) based upon the total amount of the resin composition and about 5 to about 30% by weight of the total amount of components (c) and (d) based upon the total amount of the resin composition.

2. The resin composition of claim 1, wherein the polyphenylene ether resin (a) is a phenylene ether homopolymer, a phenylene ether copolymer or a phenylene ether polymer grafted with an aromatic vinyl compound.

3. The resin composition of claim 1, wherein the polyphenylene ether resin (a) is poly(2,6-dimethyl-1,4-phenylene)ether, 2,6-dimethylphenol/2,3,6-trimethylphenol copolymer or a grafted phenylene ether polymer obtained by grafting styrene thereon.

4. The resin composition of claim 1, wherein the polystyrene-type resin (b) is polystyrene, a high-impact polystyrene, a styrene/butadiene/acrylonitrile copolymer, a styrene/maleic anhydride copolymer, a high-impact styrene/maleic anhydride copolymer, a poly-p-methyl styrene, a high-impact poly-p-methyl styrene, or a p-methylstyrene/maleic anhydride copolymer.

5. The resin composition of claim 1, wherein the A-B-A' type elastomeric block copolymer (c) is selected from the group consisting of elastomers having a Young's modulus at room temperature of $10^5$ to $10^9$ dynes/cm$^2$.

6. The resin composition of claim 1, wherein the resin composition contains component (a) in an amount of 15 to 75% by weight based upon the total weight of components (a) and (b), and component (c) in an amount of 5 to 80% by weight based upon the total weight of components (c) and (d).

* * * * *